Patented Dec. 26, 1950

2,535,085

UNITED STATES PATENT OFFICE 2,535,085

CYCLOPENTYL-ISOBUTYL-ACETIC ACID

Robert B. Moffett, Kalamazoo, Mich., and Charlotte Anne Hart, Kansas City, Mo., assignors to George A. Breon and Company, Kansas City, Mo., a corporation of Missouri No Drawing. Application February 8, 1949, Serial No. 75,302

2 Claims. (Cl. 260—514)

This invention relates to cyclopentyl-isobutyl-acetic acid having the formula

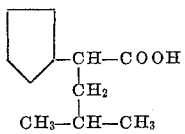

and to salts thereof.

These substances of our invention are useful as intermediates for preparing antispasmodics. Moreover, the free acid and its salts with non-toxic cations are also useful as bile flow stimulants. A water-soluble salt is particularly adapted for the latter purpose, and such a salt is prepared by reaction of the acid with an equivalent amount of an appropriate base, preferably an alkali metal hydroxide, carbonate or bicarbonate.

Our new compounds can be prepared as described in the following example.

Example (a). *Diethyl $\Delta^2$ - cyclopentenyl - isobutylmalonate.*—To a stirred suspension of 27.6 g. (1.2 m.) of powdered sodium in 240 cc. of dry toluene is slowly added 271.6 g. (1.2 m.) of diethyl $\Delta^2$-cyclopentenylmalonate. [Noller and Adams, J. Am. Chem. Soc. 48, 2444 (1926)]. After nearly all of the sodium has reacted at reflux temperature, 210 g. (1.5 m.) of isobutyl bromide is added dropwise and the mixture refluxed for sixteen hours. After cooling, the mixture is neutralized with dilute acetic acid, and the toluene layer is washed with water, dried over anhydrous sodium sulfate and concentrated. The residue is distilled at reduced pressure, first through a Claisen head and then redistilled through an efficient fractionating column. After discarding considerable low boiling material, the product distils at 73° C. (0.02 mm.) giving about 145 g. (46%) of diethyl $\Delta^2$-cyclopentenyl-isobutylmalonate, $n_D^{25}=1.4580$, $d_4^{25}=1.0157$ (b). *Diethyl cyclopentyl - isobutylmalonate.*—A solution of 77.7 g. (0.275 m.) of diethyl $\Delta^2$-cyclopentenyl-isobutylmalonate in 30 cc. of alcohol is hydrogenated in the presence of 0.2 g. of Adams platinum oxide catalyst at about 50 pounds pressure. Reduction is complete in about one hour. The product is recovered and distilled at reduced pressure through a Claisen head, giving about 76 g. (98%) of diethyl cyclopentyl-isobutylmalonate, B. P. 96° C. (0.04 mm.);

$n_D^{25}=1.4532$; $d_4^{25}=1.0023$

Diethyl cyclopentyl-isobutylmalonate can also be prepared by alkylation of diethyl cyclopentyl-malonate with an isobutyl halide using the general method of part (a). Still another modification involves alkylation of diethyl cyclopentyl-malonate with a methallyl halide, followed by reduction of the double bond of the methallyl group.

(c). *Cyclopentyl-isobutylacetic acid.*—A mixture of 1160 g. of diethyl cyclopentyl-isobutyl-malonate with a solution of 1000 g. of potassium hydroxide in 2500 cc. of ethanol is heated in a bomb at 140–150° C. for three hours. After cooling, most of the alcohol is distilled off, water is added to the residue and the whole neutralized with hydrochloric acid. The substituted malonic acid is extracted with ether, and the ether extracts are washed with water and with saturated sodium chloride solution containing a little sodium bicarbonate, and finally dried over anhydrous sodium sulfate. The ether is then distilled off and the residue heated to 170° C. until carbon dioxide ceases to be evolved. Distillation at reduced pressure gives about 810 g. (97%) of cyclopentyl-isobutylacetic acid, B. P. 79–82° C. (0.08 mm.); $n_D^{25}=1.4549$; $d_4^{25}=0.9525$.

When cyclopentyl-isobutylacetic acid is treated with a solution of one equivalent of sodium hydroxide or sodium carbonate or sodium bicarbonate, sodium cyclopentyl-isobutylacetate is produced in solution and can be isolated by evaporation of the solution.

The instant application is a continuation-in-part of our prior U. S. Patent Application, Serial No. 43,542, filed August 10, 1948, which is, in turn, a continuation-in-part of our prior U. S. Patent application, Serial No. 643,480, filed January 25, 1946, now abandoned.

We claim:

1. A member of the group consisting of cyclopentyl-isobutylacetic acid having the formula

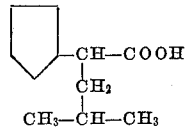

and non-toxic salts thereof.

2. Cyclopentyl-isobutylacetic acid having the formula

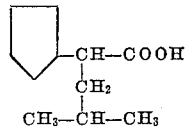

ROBERT B. MOFFETT.
CHARLOTTE ANNE HART.

(References on following page)

REFERENCES CITED

The following references are of record in the file of this patent:

UNITED STATES PATENTS

| Number | Name | Date |
| --- | --- | --- |
| 1,677,123 | Adams | July 17, 1928 |
| 1,715,052 | Adams | May 28, 1929 |

FOREIGN PATENTS

| Number | Country | Date |
| --- | --- | --- |
| 728,998 | France | July 19, 1932 |

OTHER REFERENCES

Perkins, J. Am. Chem. Soc., vol. 49, pp. 517–522 (1927).

V. Braun et al., Chem. Abstracts, vol. 31, Col. 5758–5759 (1937).